United States Patent [19]

Oliver

[11] Patent Number: 4,952,905
[45] Date of Patent: Aug. 28, 1990

[54] DATA COMMUNICATION SYSTEM

[75] Inventor: Colin C. Oliver, Slough, England

[73] Assignee: EMI Limited, Middlesex, England

[21] Appl. No.: 282,974

[22] Filed: Nov. 29, 1988

Related U.S. Application Data

[63] Continuation of Ser. No. 841,222, Mar. 19, 1986, abandoned.

[30] Foreign Application Priority Data

Mar. 20, 1985 [GB] United Kingdom ............. 8507281

[51] Int. Cl.⁵ .............................................. G08B 13/00
[52] U.S. Cl. ........................... 340/310 R; 340/310 A;
340/310 CP; 340/825.36
[58] Field of Search ........ 340/310 A, 310 R, 310 CP,
340/288, 506, 531, 533, 538, 825.57, 825.36,
825.37, 524, 825.38, 825.39, 825.08; 370/90;
455/612

[56] References Cited

U.S. PATENT DOCUMENTS

| | | |
|---|---|---|
| 3,697,975 | 10/1972 | Bernstein et al. .................. 340/288 |
| 3,980,996 | 9/1976 | Greenspan et al. ................. 455/127 |
| 4,268,818 | 5/1981 | Davis et al. ..................... 340/310 R |
| 4,290,056 | 9/1981 | Chow ............................. 340/310 R |
| 4,453,162 | 6/1984 | Money et al. ..................... 455/127 |
| 4,495,649 | 1/1985 | Iwata ............................. 455/115 |
| 4,613,848 | 9/1986 | Watkins .......................... 340/825.36 |

FOREIGN PATENT DOCUMENTS 0111604 6/1984 European Pat. Off.
1598553 9/1981 United Kingdom.

Primary Examiner—Joseph A. Orsino
Assistant Examiner—Brent Swarthout
Attorney, Agent, or Firm—Fleit, Jacobson, Cohn, Price, Holman & Stern

[57] ABSTRACT

A communication system utilizing the electrical-supply wiring of mains circuit has an interface unit for an intruder-sensor. Unit has a transmitter for sending FSK-modulated messages and a capacitor to store adequate energy to power transmitter only for the time-duration of a message. The system also has a interface unit for a temperature sensor.

8 Claims, 1 Drawing Sheet

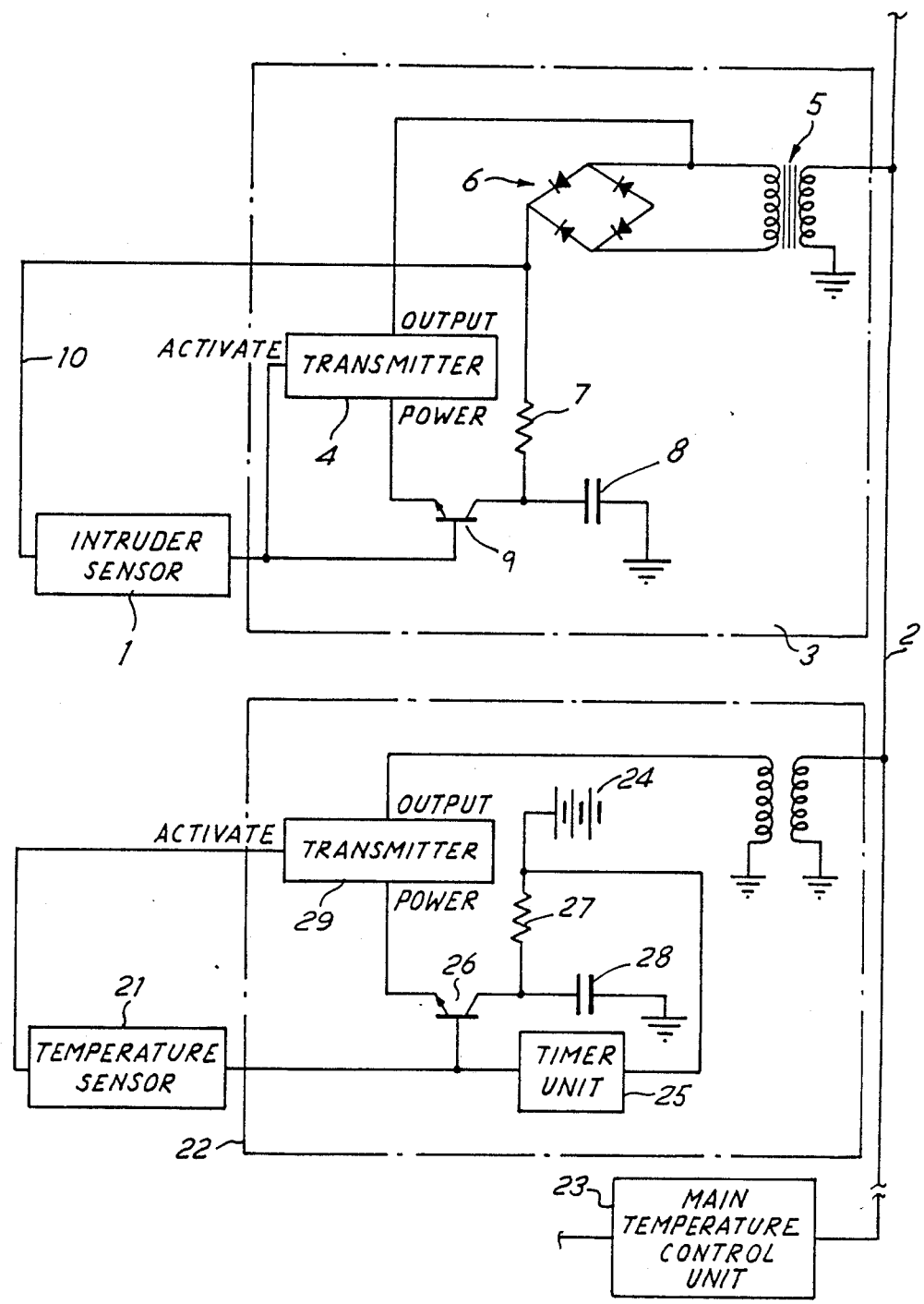

DATA COMMUNICATION SYSTEM

This application is a continuation of application Ser. No. 841,222, filed Mar. 19, 1986, and now abandoned.

FIELD OF THE INVENTION

The present invention relates to a communication system whereby signals are sent along the electrical-supply wiring, and to an interface unit for use in a communication system.

DESCRIPTION OF RELATED ART

In a typical form of such a communication system, a control receiver inside the home monitors a number of sensors which are distributed throughout the home and are associated with, for example, thermostats, intruder detectors and domestic appliances. Each sensor can transmit binary data over the mains wiring to the central receiver by phase shift or frequency shift keying of an R.F. carrier. The absence of carrier on the wire indicates that the channel is free and access to the channel is on a "first-come, first-served" basis. Each transmitter in the sensors sends only a short burst of data, then turns off to enable other transmitters to access the line; clearly, if that transmitter's call has not been answered after a predetermined time, it may send out another short burst of data. However, if the transmitter is faulty, it may send out a carrier signal continuously, thereby preventing all the other transmitters access to the line until the fault is remedied.

British Patent Specification No. 1598553 describes a conventional communication system which utilizes the electrical-supply wiring. The system includes a condensor which is common to all data sources and which is powered by selective connection with a receiving station. When the charge in the condensor reaches a predetermined value, a switch disconnects the condenser from the power source and connects it to the data transmitter which is activated by the condensor discharge. Once the condensor has discharged to a predetermined level it is again connected to the charging source and disconnected from the data transmitter.

SUMMARY OF THE INVENTION

The present invention provides an electrical-supply communications system for the transmission of messages, each of a predetermined duration, between elements in an electrical-supply wiring circuit, the system comprising: a plurality of elements linked together by wiring for the electrical-supply; each element consisting of an electrical appliance with an interface unit; each interface unit having means to transmit a data message to other elements of the communication system, the transmission means including means to apply a carrier signal to the electrical-supply wiring; each interface unit also having means to store energy for powering the transmission means, the energy-storage means being connected permanently to the electrical-supply wiring and having a capacity substantially equivalent to the power needed to operate the transmission means for the time interval corresponding to the predetermined duration of a message for the communication system, thereby to permit only intermittent operation of the transmission means.

Preferably, the energy-storage means of at least one interface unit comprises an arrangement of one or more capacitors and resistors of values such that the instantaneous current flow taken directly from the electrical-supply wiring is inadequate to operate the transmission means, but an energy accommulation within the capacitor(s) due to a sustained current flow enables intermittent operation of the transmission means.

The present invention also provides an interface unit for use in an electrical-supply communications system for the transmission of messages, each of a predetermined duration, between elements in an electrical-supply wiring circuit, the unit comprising: means to transmit a data message to other element(s) of the communication system, the transmission means including means to apply a carrier signal to electrical-supply wiring of the system; means, when connected permanently to the electrical-supply wiring, to store energy for powering the transmission means, the energy-storage means having a capacity substantially equivalent to the power needed to operate the transmission means for the time interval corresponding to the predetermined duration of a message for the communication system, thereby to permit only intermittent operation of the transmission means.

BRIEF DESCRIPTION OF THE DRAWINGS

In order that the invention may more readily be understood, a description is now given, by way of example only, reference being made to the sole accompanying FIGURE which shows schematically part of a communication network embodying the present invention.

DESCRIPTION OF THE PREFERRED EMBODIMENT

In the sole FIGURE, an intruder-sensor 1, fixed to a window in a home, is electrically connected to the electrical-supply mains circuit 2 via an interface unit 3 for use in a communication system incorporating the electrical-supply wiring. Also a temperature sensor 21 is electrically connected to the electrical mains circuit 2 via an interface unit 22 which is of a different type to the interface unit 3 of intruder-sensor 1.

Considering firstly the interface unit 3, it has a transmitter 4 which is capable of sending FSK-modulated data messages of duration X milliseconds with a repeat period of Y milliseconds, transmitter 4 having a power consumption of P Watts. Also, interface unit 3 has a transformer 5 for coupling with the electrical mains circuit 2, a diode bridge 6 to rectify any signals from mains circuit 2, a resistor 7 of R ohms and capacitor 8 of $C\mu F$ arranged such as to enable current originating from the mains circuit to charge up the capacitor 8. A transistor 9 is provided in order to act as a switch device which is normally open-circuit, but can be changed to closed-circuit during any activation of sensor 1. When transistor 9 is gated so as to be in the closed-circuit mode, it provides capacitor 8 with a discharge path to transmitter 4.

At all times sensor 1 is powered from the mains circuit 2 via line 10. When sensor 1 is activated by an intrusion, it outputs a pulse which both instructs transmitter 4 to send out a burst of data and gates transistor 9 to the closed-circuit mode thereby discharging capacitor 8 and powering transmitter 4.

Once the transmitter 4 has completed the sending out of its X millisecond message, it reverts to a passive mode in which it counts the time elapsing until a repeat data burst (if necessary) is due. The capacitance value C of capacitor 8 is chosen such that, when fully charged, it holds sufficient energy to enable transmitter 4 to send out a data message only for X milliseconds or slightly longer (but certainly substantially less than the repeat period Y milliseconds). In this way, even if the transmitter 4 where faulty such that the data burst would not terminate after X milliseconds, it would not have adequate power to transmit any signal (whether a data burst or merely the carrier frequency) significantly beyond the X millisecond interval. The resistance value R of resistor 7 is chosen such that it limits the current drawn from mains circuit 2 to a value below that necessary to power transmitter 4, while ensuring that capacitor 8 can be fully-charged by the time any repeat data burst is due, i.e. the time constant, RC of capacitor 8 must be less than (Y−X) milliseconds.

Considering now temperature sensor 21 and its associated interface unit 22, the sensor 21 periodically determines the ambient temperature of the room in which it is located, and interface unit 22 transmits an appropriate signal onto the mainsborne network. A main heater control unit 23 records the outputs from all the temperature sensors (equivalent to sensor 21) in the respective rooms of the house, and uses all this information in controlling the operation of the domestic heating system.

Interface unit 22 has a 10 volt dry-cell battery 24 as a power source, and a timer unit 25 suitably set to activate periodically a transistor switch 26 whenever a temperature reading is required e.g. at intervals of 50 seconds. A resistor 27 of 5 K$\Omega$ and a capacitor 28 of $10^3$ $\mu$F perform the same functions as resistor 7 and capacitor 8, respectively, of interface unit 3. When transistor switch 26 is gated so as to be in the closed-circuit mode, it provides capacitor 28 with a discharge path to a transmitter 29 which is accordingly powered for a limited period; the time for discharging would be about 10 milliseconds. Transmitter 29 can produce an output provided its input terminal connected to transistor 26 is at 6 volts or more. The output from timer unit 25 is also used to instruct temperature sensor 21 to effect a measurement; the resultant output signal, which represents the ambient temperature reading, is passed to transmitter 29 in order to activate it to send out a signal (a 20 millisecond burst of, typically, 50 m Amp) containing the temperature information from sensor 21. In this example, the charging time for capacitor 28 would be about 5 seconds.

Timer unit 25 may be adjusted to produce output signals at regular, equi-spaced intervals; alternatively it may produce output signals with a certain degree of irregularity, in an attempt to avoid the co-incidence (on the communication network) of signals from different sensors.

In a modification, the hard-wire connection between interface unit 22 and the mains circuit 2 is replaced by an infra-red signal link. Thus the interface unit 22 has an infra-red transmitter instead of transmitter 29 which now sends out corresponding data messages (in infra-red format) to a reception unit (incorporating an infra-red receiver) which is electrically wired to the mains circuit 2. This arrangement enables the interface unit to be placed at a location remote from the existing mains circuit without requiring any substantial re-wiring.

I claim:

1. An electrical-supply communications system for the transmission of messages, each of a predetermined duration, between elements in an electrical-supply wiring circuit, the system comprising: wiring to provide connection with an electrical-supply; a plurality of elements, each connected to the electrical-supply wiring to effect powering of said element; the elements linked together by the electrical-supply wiring for the transfer therebetween of messages; each element consisting of an electrical appliance with an interface unit; each interface unit having means to transmit a data message to other elements of the communication system, the transmission means including means to apply a carrier signal to the electrical-supply wiring; each interface unit also having an individual means to store energy for powering the transmission means within the interface unit, each energy-storage means being connected permanently to a charging source, each energy storage means being arranged to power only the transmission means within the same element in response to an electrical signal emitted by the electrical appliance within said element, each energy storage means having a capacity substantially equivalent to the power needed to operate the transmission means which it is arranged to power for the time interval corresponding to the predetermined duration of a message for the communication system thereby to permit only intermittent operation of each said transmission means.

2. A system according to claim 1, characterized by the energy-storage means of at least one interface unit comprising an arrangement of one or more capacitors and resistors of values such that any instantaneous current flow taken directly from the electrical-supply wiring to the transmission means is inadequate to operate the transmission means, but an energy accumulation within said one or more capacitors due to a sustained current flow enables intermittent operation of the transmission means.

3. An interface unit for use in an electrical-supply communications system for the transmission of messages, each of a predetermined duration, between elements in an electrical-supply wiring circuit, each element incorporating a respective electrical appliance, the unit comprising: means to transmit a data message to other elements of the communication system, the transmission means including means to apply a carrier signal to electrical-supply wiring of the system; means connected permanently to a charging source, to store energy for powering the transmission means, the energy storage means not being effective to power any further transmission means, the energy storage means being arranged to power the transmission means in response to an electrical signal emitted by the electrical appliance associated with the unit, the energy-storage means having a capacity substantially equivalent to the power needed to operate the transmission means for the time interval corresponding to the predetermined duration of a message for the communication system thereby to permit only intermittent operation of the transmission means.

4. An interface unit according to claim 3, characterized by the energy-storage means comprising an arrangement of one or more capacitors and resistors of values such that any instantaneous current flow taken directly from the electrical-supply wiring to the transmission means is inadequate to operate the transmission means, but an energy accumulation within said one or more capacitors due to a sustained current flow enables intermittent operation of the transmission means.

5. A communication system for the transmission of messages, each of a predetermined duration, between elements of the system, the system comprising: a plurality of elements, each connected to an electrical-supply to effect powering of said element, each element consisting of an electrical appliance with an interface unit; each interface unit including a transmission means for transmitting a data message to other elements of the communication system, each interface unit also having an individual means to store energy for powering the transmission means within the interface unit, each energy-storage means being connected permanently to a charging source, each energy storage means being arranged to power only the transmission means within the same element in response to an electrical signal emitted by the electrical appliance within said element, each energy storage means having a capacity substantially equivalent to the power needed to operate the transmission means which it is arranged to power for the time interval corresponding to the predetermined duration of a message for the communication system thereby to permit only intermittent operation of each said transmission means.

6. An interface unit for use in a communications system for the transmission of messages, each of a predetermined duration, between elements of the system, each element incorporating a respective electrical appliance and a respective interface unit, the interface unit comprising: transmission means for transmitting a data message to other elements of the communication system, energy storage means connected permanently to a charging source, to store energy for powering the transmission means, the energy storage means not being effective to power any further transmission means, the energy storage means being arranged to power the transmission means in response to an electrical signal emitted by the electrical appliance associated with the unit, the energy-storage means having a capacity substantially equivalent to the power needed to operate the transmission means for the time interval corresponding to the predetermined duration of a message for the communication system thereby to permit only intermittent operation of the transmission means.

7. A communications system according to claim 5 in which each interface unit includes resistive means for limiting the instantaneous current drawn from the charging source by the storage means to a value below that necessary to operate the transmission means whilst enabling the energy accumulation within the storage means to be sufficient to power the transmission means when required.

8. An interface unit according to claim 6 including resistive means for limiting the instantaneous current drawn from the charging source by the storage means to a value below that necessary to operate the transmission means whilst enabling the energy accumulation within the storage means to be sufficient to power the transmission means when required.

* * * * *